(12) United States Patent
Nakajima et al.

(10) Patent No.: US 7,147,919 B2
(45) Date of Patent: Dec. 12, 2006

(54) EXPANSION GRAPHITE SHEET OF HIGH THERMAL RESISTANCE, AND EXHAUST GASKET OF HIGH THERMAL RESISTANCE

(75) Inventors: Kouichi Nakajima, Saitama (JP); Shintaro Koike, Saitama (JP); Yoshiaki Hamada, Saitama (JP); Yukihiro Ichio, Saitama (JP); Yasunori Murakami, Wako (JP); Naoko Sato, Wako (JP); Masamune Tabata, Wako (JP); Takashi Shiraishi, Wako (JP)

(73) Assignees: Nippon Leakless Industry Co., Ltd., Tokyo (JP); Honda Motor Co., Ltd., Tokyo (JP)

( * ) Notice: Subject to any disclaimer, the term of this patent is extended or adjusted under 35 U.S.C. 154(b) by 48 days.

(21) Appl. No.: 11/036,383

(22) Filed: Jan. 18, 2005

(65) Prior Publication Data
US 2005/0186425 A1   Aug. 25, 2005

(30) Foreign Application Priority Data
Jan. 15, 2004   (JP)   ............................. 2004/008245

(51) Int. Cl.
*B32B 9/00*   (2006.01)

(52) U.S. Cl. ..................................................... 428/408
(58) Field of Classification Search ................ 428/408; 427/445 R; 423/448; 264/26, 27
See application file for complete search history.

(56) References Cited

U.S. PATENT DOCUMENTS 3,719,608 A * 3/1973 Olstowski ................... 252/506
3,997,294 A * 12/1976 Kritzler ...................... 422/175
4,670,201 A * 6/1987 Montgomery et al. ...... 264/486

* cited by examiner

*Primary Examiner*—Jennifer C. Mcneil
*Assistant Examiner*—Daniel Miller
(74) *Attorney, Agent, or Firm*—Young & Thompson

(57) ABSTRACT

An expansion graphite sheet of high thermal resistance includes an expansion graphite as a main component, and inorganic thermal resistance particles made of at least one selected from the group consisting of aluminum boride ($AlB_2$ and/or $AlB_{12}$), silicon boride ($SiB_6$), zinc boric acid ($2ZnO.3B_2O_3.3.5H_2O$) and phosphorous boride (PB). An exhaust gasket made of the expansion graphite sheet, in addition to the expansion graphite sheet, can exhibit high thermal (oxidization) resistance under a high temperature of 600–700° C.

8 Claims, 5 Drawing Sheets

(a)

(b)

EXPANSION GRAPHITE SHEET OF HIGH THERMAL RESISTANCE, AND EXHAUST GASKET OF HIGH THERMAL RESISTANCE

BACKGROUND OF THE INVENTION

1. Field of the Invention

This invention relates to an expansion graphite sheet which is preferably usable for an exhaust gasket of engine, and also to the exhaust gasket.

2. Description of the Background Art

A conventional expansion graphite sheet would be fabricated as described in Patent Document 1, for example, where natural graphite is treated with sulfuric acid, nitric acid and phosphoric acid (which are interlayer intercalating agents and prepared in the form of solid or solution) to form graphite particles through the intercalation of the intercalating agents therein which are thermally treated later so as to be grown along the c-axis (vertically) and pressed to form the intended expansion graphite sheet. In the use of the expansion graphite sheet for an exhaust gasket, the expansion graphite sheet is cut out and molded in compression.

[Patent Document 1] W001/05703 international publication

Generally, the exhaust gasket would be used under a high temperature condition within a range of 600–700° C., and in contrast, the conventional expansion graphite sheet would be oxidized at about 500° C., so that if the exhaust gasket made of the conventional expansion graphite sheet is used under a high temperature condition of 600° C. or over, the exhaust gasket can not exhibit the sealing performance sufficiently due to the oxidization thereof.

In this point of view, it is desired to develop an expansion graphite sheet of high thermal resistance (high oxidation resistance) against a thermal condition within a range of 600–700° C.

SUMMERY OF THE INVENTION

It is an object of the present invention to provide an expansion graphite sheet of high thermal resistance so as to iron out the above-mentioned conventional problem relating to the sealing performance of the exhaust gasket made of the expansion graphite sheet.

In order to achieve the above object, this invention relates to an expansion graphite sheet of high thermal resistance, comprising:

an expansion graphite as a main component, and inorganic thermal resistance particles made of at least one selected from the group consisting of aluminum boride ($AlB_2$ and/or $AlB_{12}$), silicon boride ($SiB_6$), zinc boric acid ($2ZnO.3B_2O_3.3.5H_2O$) and phosphorous boride (PB).

In the experiment by the inventors, it is confirmed that the expansion graphite sheet of high thermal resistance can exhibit a high thermal resistance against a thermal condition within a range of 600° C. or over. Although the reason why the present expansion graphite sheet can exhibit the high thermal resistance has not be clarified yet, it is considered that as the environmental temperature rises up to 600° C. or over, the inorganic thermal resistance particles which are made of at least one selected from the group consisting of aluminum boride ($AlB_2$ and/or $AlB_{12}$), silicon boride ($SiB_6$), zinc boric acid ($2ZnO.3B_2O_3.3.5H_2O$) and phosphorous boride (PB) are melted and separated to form glass films covering the graphite particles, block off oxygen with the glass films and thus, prevent the oxidization of the graphite particles. As a result, the present expansion graphite sheet can be prevented from being oxidized.

According to the present expansion graphite sheet of high thermal resistance, in the use of the expansion graphite sheet for the exhaust gasket under a high temperature condition, the duration of life of the exhaust gasket can be elongated without the oxidization thereof.

In a preferred embodiment of the present invention, the expansion graphite sheet includes 90–99 wt % of the expansion graphite and 1–10 wt % of the inorganic thermal resistance particles. Even though the expansion graphite sheet includes more than 10 wt % of the inorganic thermal resistance particles, the thermal resistance of the expansion graphite sheet can not be enhanced, but the flexibility of the expansion graphite sheet may be deteriorated. In this point of view, the content of the inorganic thermal resistance particles is preferably set within 1–10 wt %.

Other advantages and details of the present invention will be described hereinafter.

BRIEF DESCRIPTION OF THE DRAWINGS

For better understanding of the present invention, reference is made to the attached drawings, wherein.

DESCRIPTION OF THE PREFERRED EMBODIMENTS

Figure 1:
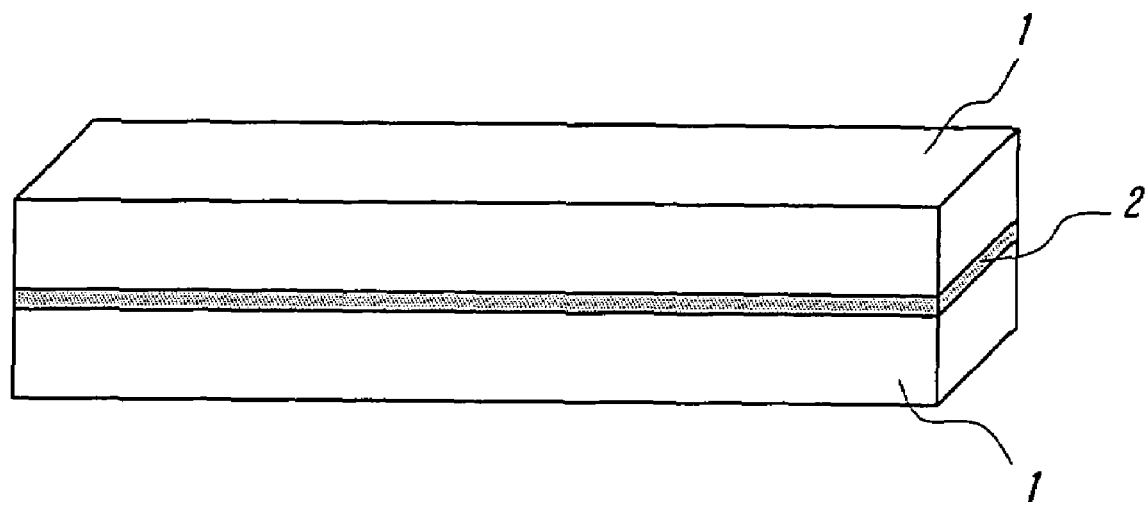
FIG. 1 is a perspective view schematically illustrating an embodiment of an expansion graphite sheet according to the present invention.

This invention will be described in detail with reference to the accompanying drawings. FIG. 1 is a perspective view schematically illustrating an embodiment of an expansion graphite sheet according to the present invention. The reference numeral "1" designates expansion graphite layers, respectively, and the reference numeral "2" designates an inorganic thermal resistance particle layer.

In this embodiment, the expansion graphite sheet of high thermal resistance includes the expansion graphite layers 1 and the inorganic thermal resistance particle layer 2 which is sandwiched by the expansion graphite layers 1. In the fabrication of the expansion graphite sheet illustrated in FIG. 1, a normal expansion graphite sheet is prepared, and inorganic thermal resistance particles made of at least one selected from the group consisting of aluminum boride ($AlB_2$), silicon boride ($SiB_6$), zinc boric acid ($2ZnO.3B_2O_3.3.5H_2O$) and phosphorous boride (PB) is stacked on the normal expansion graphite sheet, and another normal expansion graphite sheet is stacked on the inorganic thermal resistance particles. Then, the resultant laminate is pressed to form the intended expansion graphite sheet of three-layered structure through the pressing of the inorganic thermal resistance particle layer and the expansion graphite layers. In the content ratio of the inorganic thermal resistance particle layer 2 to the expansion graphite layers 1 is set within 1–10 wt %, and the residual content ratio (Ba 1) of the expansion graphite layers 1 is set within 90–99 wt %.

Figure 2:
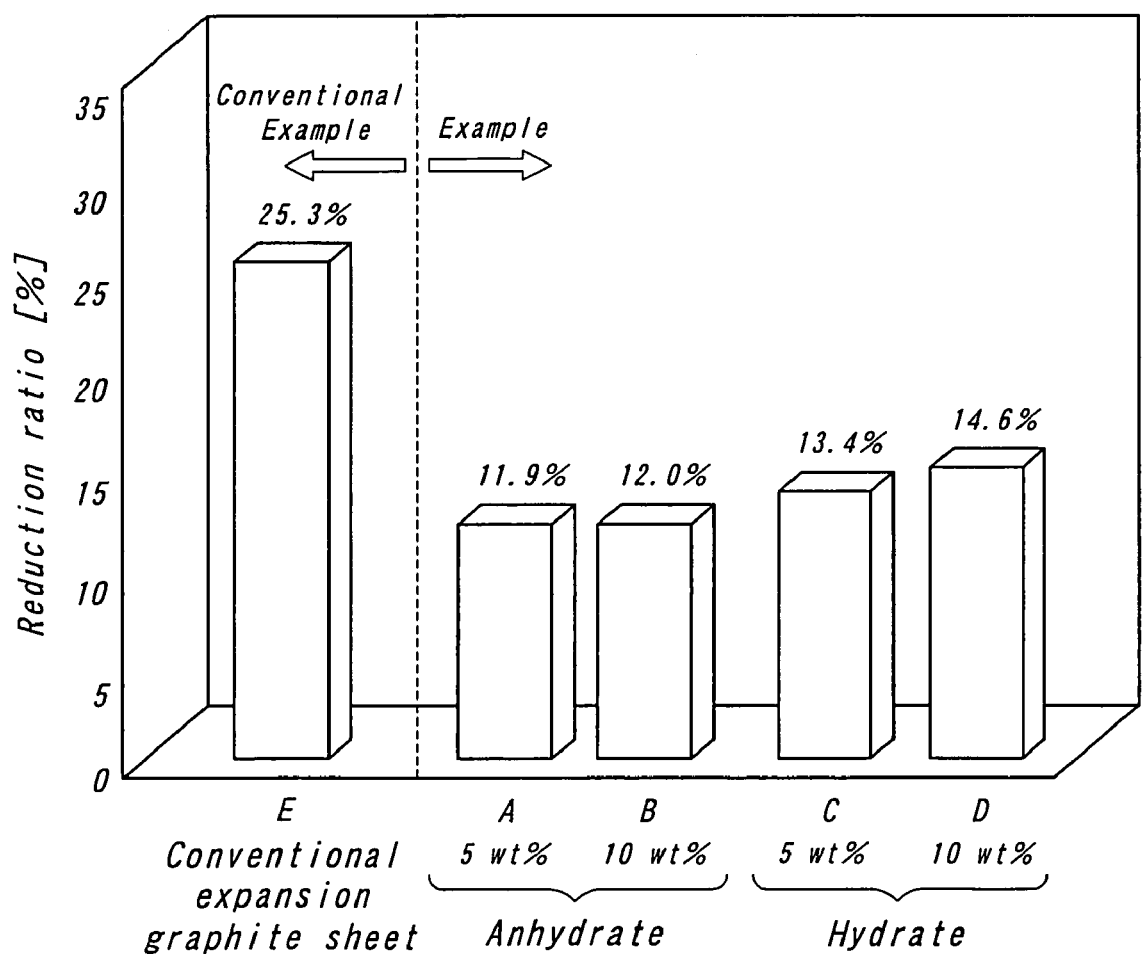
FIG. 2 is a graph illustrating the thermal resistance experimental results of expansion graphite sheets of the present invention and a conventional expansion graphite sheet.

FIG. 2 is a graph illustrating thermal resistance experimental results of expansion graphite sheets of the present invention and a conventional expansion graphite sheet. In the thermal resistance experiments, samples A–E were prepared. The sample A is an expansion graphite sheet of the present invention where the inorganic thermal resistance particle layer 2 is made of the zinc boric acid ($2ZnO.3B_2O_3.3.5H_2O$) and included by 5 wt %. Herein, the crystal water is removed from the zinc boric acid through heating. The sample B (corresponding to Example 1, later) is an expansion graphite sheet of the present invention where the inorganic thermal resistance particle layer 2 is made of the zinc boric acid ($2ZnO.3B_2O_3.3.5H_2O$) and included by 10 wt %. Herein, the crystal water is also removed from the zinc boric acid through heating. The sample C is an expansion graphite sheet of the present invention where the inorganic thermal resistance particle layer 2 is made of the zinc boric acid ($2ZnO.3B_2O_3.3.5H_2O$) and included by 5 wt %. The sample D is an expansion graphite sheet of the present invention where the inorganic thermal resistance particle layer 2 is made of the zinc boric acid ($2ZnO.3B_2O_3.3.5H_2O$) and included by 10 wt %. The sample E is a conventional expansion graphite sheet.

The thermal resistance (oxidization resistance) experiment was performed under the condition that the experimental temperature is 750° C., and the holding period of time is two hours, and the environmental atmosphere is air which is supplied continuously. As is apparent from FIG. 2, the reduction ratios in weight of the samples A–D are almost as half as the one of the sample E. Therefore, it is confirmed that the samples A–D can exhibit high thermal resistance particularly within a temperature range of 600–700° C. because the temperature range is lower than the experimental temperature of 750° C.

Table 1 presents the thermal resistance experimental results of expansion graphite sheet of the present invention and a conventional expansion graphite sheet. The thermal resistance experimental results of the expansion graphite sheets of the present invention are listed as Examples 1–20 in Table 1, and the thermal resistance experimental result of the conventional expansion graphite sheet is listed as Comparative Example in Table 1. In Examples 1–20, the inorganic thermal resistance particles are made of at least one selected from the group consisting of aluminum boride ($AlB_2$), silicon boride ($SiB_6$), zinc boric acid ($2ZnO.3B_2O_3.3.5H_2O$) and phosphorous boride (PB) as described in Table 1. Herein, the thermal resistance experiment relating to Table 1 was performed under the same condition as mentioned above. As is apparent from Table 1, the expansion graphite sheets of Examples 1–20 relating to the present invention can exhibit high thermal resistance in comparison with the conventional expansion graphite sheet of Comparative Example.

TABLE 1

| Example | Composition (wt %) | | | | | High temperature oxidizing reduction ratio (750° C. × 2 hr) |
|---|---|---|---|---|---|---|
| | Expansion graphite | Zinc boric acid ($2ZnO.3B_2O_3.3.5H_2O$) | Silicon boride ($SiB_6$) | Aluminum boride ($AlB_2$) | Phosphorous boride (PB) | |
| 1 | Bal | 10 | 0 | 0 | 0 | 12.0% |
| 2 | Bal | 5 | 0 | 0 | 0 | 11.9% |
| 3 | Bal | 1 | 0 | 0 | 0 | 14.5% |
| 4 | Bal | 8 | 2 | 0 | 0 | 10.1% |
| 5 | Bal | 8 | 0 | 2 | 0 | 15.1% |
| 6 | Bal | 8 | 0 | 0 | 2 | 8.5% |
| 7 | Bal | 5 | 2.5 | 2.5 | 0 | 10.6% |
| 8 | Bal | 5 | 2.5 | 0 | 2.5 | 7.3% |
| 9 | Bal | 5 | 0 | 2.5 | 2.5 | 9.4% |
| 10 | Bal | 2.5 | 2.5 | 2.5 | 2.5 | 6.8% |
| 11 | Bal | 1 | 9 | 0 | 0 | 6.8% |
| 12 | Bal | 1 | 0 | 9 | 0 | 11.0% |
| 13 | Bal | 1 | 0 | 0 | 9 | 5.8% |
| 14 | Bal | 0 | 10 | 0 | 0 | 10.5% |
| 15 | Bal | 0 | 0 | 10 | 0 | 13.8% |
| 16 | Bal | 0 | 0 | 0 | 10 | 4.6% |
| 17 | Bal | 0 | 5 | 5 | 0 | 8.6% |
| 18 | Bal | 0 | 5 | 0 | 5 | 5.4% |
| 19 | Bal | 0 | 0 | 5 | 5 | 6.5% |
| 20 | Bal | 0 | 3 | 3 | 3 | 7.3% |
| Comparative Example | 100 | 0 | 0 | 0 | 0 | 25.3% |

Figure 3:
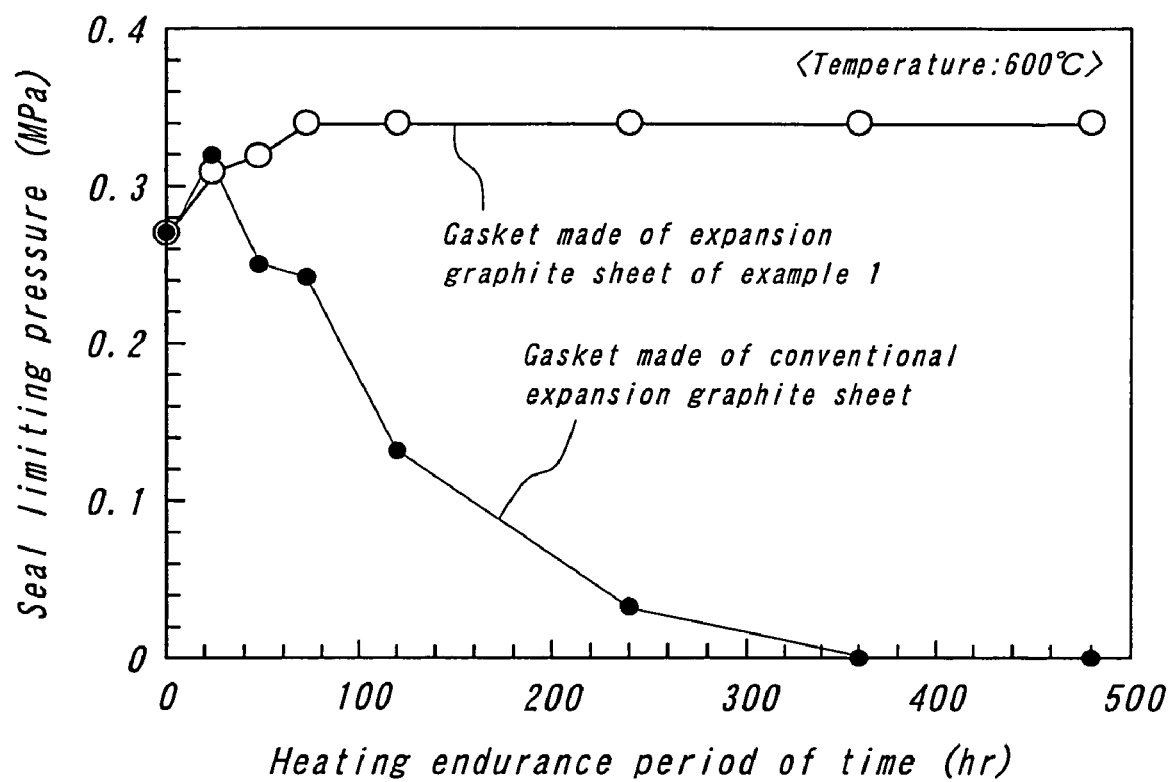
FIG. 3 is a graph illustrating the endurance experimental results of an exhaust gasket made of an expansion graphite sheet of the present invention and an exhaust gasket made a conventional expansion graphite sheet, FIG. 4(*a*) is a plan view illustrating an exhaust gasket to be experimented in endurance, FIG. 4(*b*) is an explanatory view illustrating the endurance experiment.
Figure 4:
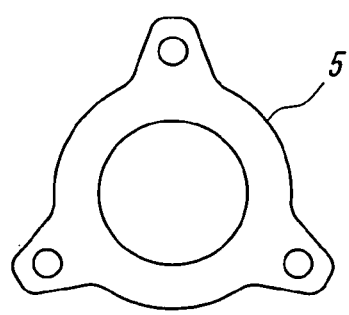
Figure 4:
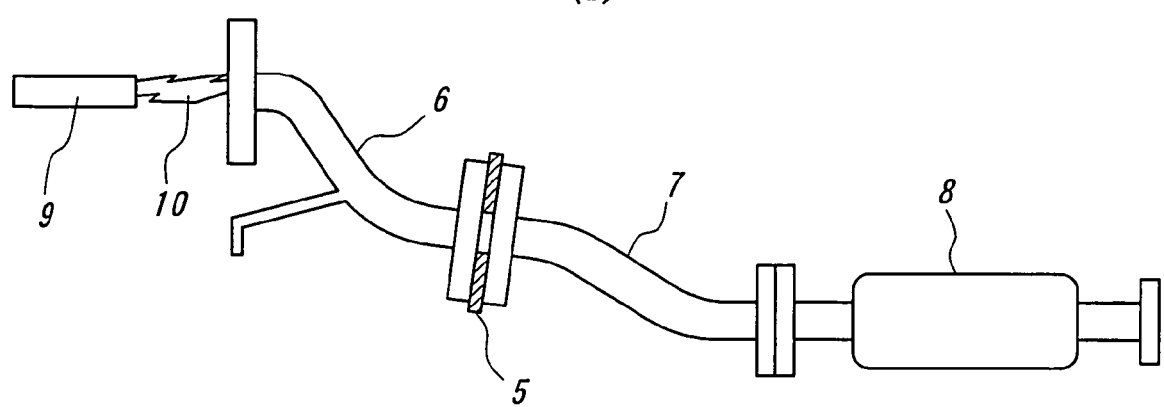

FIG. 3 is a graph illustrating the endurance experimental results of the exhaust gasket made of the expansion graphite sheet of Example 1 and the exhaust gasket made of the conventional expansion graphite sheet of Comparative Example. In this endurance experiment, the exhaust gasket 5 was made of the expansion graphite sheet in the form as illustrated in FIG. 4(a). Then, the endurance experiment was performed using the experimental instruments and arrangement as illustrated in FIG. 4(b) where the exhaust manifold 6, the exhaust pipe 7 and the catalytic converter 8 are connected with one another to constitute an exhaust of an automobile engine. In this case, the exhaust gasket 5 was inserted in between the exhaust manifold 6 and the exhaust pipe 7, and heated up to about 600° C. by blowing the flame 10 from the gas burner 6 off into the exhaust manifold 6. The exhaust gasket 5 is sealed intermittently with lids under the condition that an air of maximum pressure with 0.34 MPa is blown off in the exhaust manifold 6 and the exhaust pipe 7, thereby to examine the seal limiting pressure of the exhaust gasket 5.

As is apparent from FIG. 3, the seal limiting pressure of the exhaust gasket 5 made of the conventional expansion graphite sheet becomes almost 0 MPa at an experimental period of time of about 360 hours, and in contrast, the seal limiting pressure of the exhaust gasket 5 made of the expansion graphite sheet of Example 1 rises until an experimental period of time of about 80 hours, and maintains the maximum pressure of 0.34 MPa even at an experimental period of time of about 500 hours. Therefore, it was confirmed that the exhaust gasket made of the expansion graphite sheet of the present invention can exhibit high thermal resistance.

Therefore, the exhaust gasket made of the expansion graphite sheet of the present invention can be employed as an exhaust gasket of an automobile engine under a high temperature, so that the sealing durability of the exhaust gasket can be elongated without oxidization. In addition, particularly in the above-mentioned exhaust gasket, since the content of the inorganic high thermal resistance particles of the expansion graphite sheet is set within 1–10 wt % and the content of the expansion graphite of the expansion graphite sheet is set within 90–99 wt %, the resultant expansion graphite sheet can exhibit sufficient flexibility, so that the destruction of the exhaust gasket at the molding can be prevented and thus, the handling of the exhaust gasket can be simplified.

Figure 5:
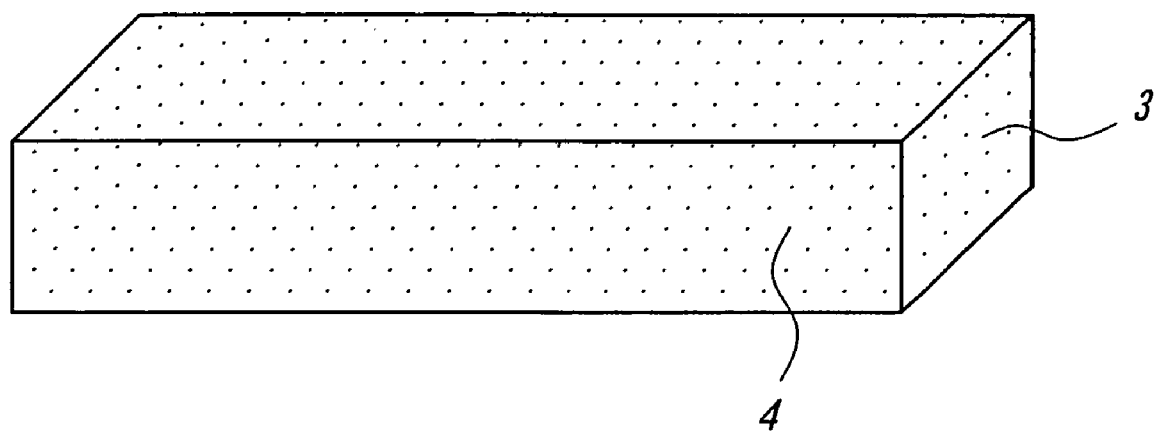
FIG. 5 is a perspective view illustrating another embodiment of an expansion graphite sheet according to the present invention.

FIG. 5 is a perspective view illustrating another embodiment of an expansion graphite sheet according to the present invention. The reference numeral "3" designates expansion graphite, and the reference numeral "4" designates inorganic thermal resistance particles. In the expansion graphite sheet illustrated in FIG. 5, the inorganic thermal resistance particles 4 are dispersed in the expansion graphite 3. In the fabrication of the expansion graphite sheet illustrated in FIG. 2, the expansion graphite 3 is made in an ordinary manner, and the inorganic thermal resistance particles 4 made of at least one selected from the group consisting of aluminum boride ($AlB_2$), silicon boride ($SiB_6$), zinc boric acid ($2ZnO.3B_2O_3.3.5H_2O$) and phosphorous boride (PB) are dispersed in the expansion graphite 3. Then, the resultant structure is pressed to form the intended expansion graphite sheet. The content ratio of the inorganic thermal resistance particles 4 to the expansion graphite layers 1 is set within 1–10 wt %, and the residual content ratio (ba 1) of the expansion graphite 3 is set within 90–99 wt %.

The expansion graphite sheet illustrated in FIG. 5 can exhibit the same function/effect as the one illustrated in FIG. 1. In these embodiments, the boric aluminum can contain $AlB_{12}$ in addition to $AlB_2$. In this case, the same function/effect as mentioned above can be exhibited.

Although the present invention was described in detail with reference to the above examples, this invention is not limited to the above disclosure and every kind of variation and modification may be made without departing from the scope of the present invention.

For example, the inorganic thermal resistance particles are dispersed in the expansion graphite to form an inorganic thermal resistance particles-dispersed layer, which is laminated with the inorganic thermal resistance particle layer later. Also, the expansion graphite sheet of the present invention can be employed in another use except an exhaust gasket

What is claimed is:

1. An expansion graphite sheet of high thermal resistance, comprising:
    two expansion graphite layers; and
    sandwiched between said two expansion graphite layers, a layer of inorganic thermal resistance particles made of at least one selected from the group consisting of aluminum boride ($AlB_2$ and/or $AlB_{12}$), silicon boride ($SiB_6$), zinc boric acid ($2ZnO.3B_2O_3.3.5H_2O$) and phosphorous boride (PB).

2. The expansion graphite sheet as defined in claim 1, wherein a content of said expansion graphite is within 90–99 wt % and a content of said inorganic thermal resistance particles is within 1–10 wt %.

3. The expansion graphite sheet as defined in claim 1, wherein said inorganic thermal resistance particles are melted and separated to cover at least one of said expansion graphite layers.

4. The expansion graphite sheet as defined in claim 1, wherein a seal limiting pressure of said expansion graphite sheet rises with time under a heating condition.

5. An exhaust gasket of high thermal resistance comprising an expansion graphite sheet of high thermal resistance, said expansion graphite sheet comprising:
    two expansion graphite layers; and
    sandwiched between said two expansion graphite layers, a layer of inorganic thermal resistance particles made of at least one selected from the group consisting of aluminum boride ($AlB_2$ and/or $AlB_{12}$), silicon boride ($SiB_6$), zinc boric acid ($2ZnO.3B_2O_3.3.5H_2O$) and phosphorous boride (PB).

6. The exhaust gasket as defined in claim 5, wherein a content of said expansion graphite of said expansion graphite sheet is within 90–99 wt % and a content of said inorganic thermal resistance particles of said expansion graphite sheet is within 1–10 wt %.

7. The exhaust gasket as defined in claim 5, wherein said inorganic thermal resistance particles of said expansion graphite sheet are melted and separated to cover at least one of said expansion graphite layers.

8. The exhaust gasket as defined in claim 5, wherein a seal limiting pressure of said expansion graphite sheet rises with time under a heating condition.

* * * * *